(12) United States Patent
Yamamoto et al.

(10) Patent No.: US 6,341,226 B1
(45) Date of Patent: Jan. 22, 2002

(54) MOBILE COMMUNICATION APPARATUS AND METHOD OF RECEIVING MOBILE COMMUNICATION SIGNALS

(75) Inventors: Katsuya Yamamoto; Masahiko Naito, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/272,388

(22) Filed: Mar. 19, 1999

(30) Foreign Application Priority Data

Mar. 23, 1998 (JP) .......................................... 10-074623

(51) Int. Cl.[7] ................................................ H04Q 7/32
(52) U.S. Cl. ........................ 455/525; 455/434; 455/437; 370/331
(58) Field of Search ................................ 455/436, 437, 455/434, 442, 513, 525; 370/331, 332, 333

(56) References Cited

U.S. PATENT DOCUMENTS

| 5,966,402 | A | * | 10/1999 | Yamamoto | .................. | 455/525 |
| 5,995,836 | A | * | 11/1999 | Wijk | ........................... | 455/437 |
| 6,041,235 | A | * | 3/2000 | Aalto | ......................... | 455/525 |
| 6,064,890 | A | * | 5/2000 | Hirose et al. | ............... | 455/513 |
| 6,167,281 | A | * | 12/2000 | Sugi | ............................ | 455/525 |

* cited by examiner

*Primary Examiner*—Edward F. Urban
(74) *Attorney, Agent, or Firm*—Jay H. Maioli

(57) ABSTRACT

With respect to each of received signals from a plurality of base stations, an average value is calculated by using detected reception energy and reception energy detected in the past to determine a received signal to be demodulated by comparing the average values. Thereby a further accurate reception energy can be obtained compared to with the case of simply detecting reception energy, even if the detected reception energy temporarily and greatly varies, thus further avoiding malfunction compared to the prior art.

6 Claims, 4 Drawing Sheets

MOBILE COMMUNICATION APPARATUS AND METHOD OF RECEIVING MOBILE COMMUNICATION SIGNALS

BACKGROUND OF THE INVENTION

1. Field of the Invention

The present invention relates to a mobile communication apparatus and a method of receiving mobile communication signal, and more particularly, is suitably applied to a mobile telephone used as a mobile station of a cellular radio communication system.

2. Description of the Related Art

The cellular radio communication system is so structured that an area where telecommunication service is provided is divided into cells of a desired size and a base station as a fixed station is installed in every cell. A mobile telephone as a mobile station communicates by radio with the base station which is assumed to provide the best communication status.

In general, in the cellular radio communication system, a plurality of mobile telephones share one base station installed in a cell to communicate by radio. This may cause radio wave interference between mobile telephones. In order to avoid such a radio wave interference problem, a variety of systems have been proposed for communication systems between a mobile telephone and a base station. A typical system is the code division multiple access (CDMA) standardized as the Interim Standard-95 (IS-95) system in the U.S.A. and other countries.

The CDMA system is a system in which a different pseudo random noise sequence (PN) code is assigned to each circuit and the PN code is used to spread the bandwidth of transmit signals which have undergone a predetermined modulation over a wider bandwidth (i.e., a spread spectrum modulation), thereby realizing multiplex communication using channels of the same frequency. The receiving side is so structured as to use the same PN code as the transmitting side to apply inverse spread to received transmit signals which have undergone the spread spectrum modulation, thereby demodulating desired transmit signals only.

As described above, in the CDMA system, a different PN code is assigned to every circuit and the transmitting side and the receiving side use the same PN code, so that the received signals are not decoded if the receiving side does not use the same PN code as the transmitting side to perform the inverse spread. The PN code is a pseudo random number series, so that the CDMA system exceeds in privacy.

As shown in FIG. 1, in a cellular radio communication system 1 of the CDMA system, the service area is divided into, for example, a plurality of cells C1 to C7, and base stations BS1 to BS7 is installed in the cells C1 to C7 respectively. The base stations BS1 to BS7 repeatedly transmit the PN codes of the same code pattern to transmit pilot signals at timing different from each other.

A mobile station MS1 checks a correlation value between the pilot signal, which is transmitted from each base station BS1 to BS7 at different timing, and the PN code generated therein. The correlation value represents reception energy of the pilot signal transmitted from the base station BS1 to BS7.

The mobile station MS1 receives a plurality of pilot signals which are transmitted at different timing, and detects such a pilot signal with timing when the reception energy becomes the maximum and thereby, communicates by radio with, for example, the base station BS1 transmitting the pilot signal. Meanwhile, the base station BS1 grasps timing of pilot signals which are transmitted from adjacent base stations BS2 to BS7 as well as the timing of the pilot signal transmitted from its own station, to give the mobile station MS1 notice of a pilot signal with which timing is transmitted from which base station.

In general, the mobile station MS1 changes a base station to be communicated therewith while moving. For example, the mobile station MS1 moves from the cell C1 as the service area of the base station BS1 being currently connected by radio to the cell C2 as the service area of the base station BS2 which is adjacent to the base station BS1.

The mobile station MS1 always monitors the reception energy of pilot signals transmitted from adjacent base stations BS2 to BS7 as well as the reception energy of the pilot signal transmitted from the base station BS1 being currently connected by radio. Accordingly, when the mobile station MS1 moves from the cell C1 to the cell C2, it compares to pilot signals transmitted from other base stations to perform switchover of radio circuits (so called, handoff) to the base station BS2 which transmits the pilot signal of the largest reception energy to the mobile station MS1. In this way, the mobile station MS1 keeps communicating by successively switching the base stations BS even when the mobile station MS1 moves anywhere.

The mobile station MS1 rarely receives radio waves from the base station BS at a certain location which commands a good view, because the mobile station MS1 communicates with the base station BS through a radio circuit. Actually, in most cases, the mobile station MS1 receives composite waves while moving, generated by synthesizing a plurality of reflective waves reflected by obstacles such as buildings and the ground. This changes the reception energy to be detected by the mobile station MS1 every moment as time passes, and may temporarily and considerably attenuate the signal level (so-called, fading).

Any change in the reception energy in the case where the fading occurs will be explained by using FIG. 2. The reception energy E1 shows the measurement results obtained when radio waves from the base station BS1 are received by the mobile station MS1. The reception energy E2 shows the measurement results obtained when radio waves from the base station BS2 are received.

In this case, since the mobile station MS1 locating within the cell C1 is connected by radio to the base station BS1 in the cell C1, it is apparent that the signal level of the reception energy E1 is greater than that of the reception energy E2. However, if the reception energies are detected at the timing of time T1 and T2, the signal levels are reversed due to fading or the like, that is, the signal level of the reception energy E2 is greater than that of the reception energy E1. Accordingly, the mobile station MS1 performs a handoff between the reception energy detection timing of time T1 and the next detection timing and between the reception energy detection timing of time T2 and the next detection timing.

Since the mobile station MS1 has to perform the handoff in a moment, if the fading occurs like that, the mobile station MS performs the handoff even when the handoff is unnecessary, so that it performs an unsuitable operation. Especially, while conversation is in progress, the control data has to be communicated between the mobile station MS1 and the base station BS many times, so that the conversation may be disrupted.

SUMMARY OF THE INVENTION

In view of the foregoing, an object of this invention is to provide a mobile communication apparatus and a method of receiving mobile communication signals capable of further preventing an unsuitable operation as compared with the prior art.

The foregoing object and other objects of the invention have been achieved by the provision of a mobile communication apparatus which comprises an antenna for receiving signals transmitted from a plurality of base stations, a demodulating means for demodulating a single received signal out of a plurality of received signals received with the antenna, a detecting means, whenever the detecting means detects each of reception energy values of the plurality of received signals, for repeatedly detecting reception energy values of the plurality of reception signals, and a control means for calculating the average value of reception energy, comparing the average of the reception energy, and demodulating a received signal having the largest reception energy with the demodulating means, The average value of the reception energy detected this time and the reception energy detected in the past is calculated, and the average value is set as the reception energy, so that further accurate reception energy can be obtained as compared with the case of simply detecting reception energy, even when the detected reception energy temporarily and greatly varies.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings.

Figure 1:
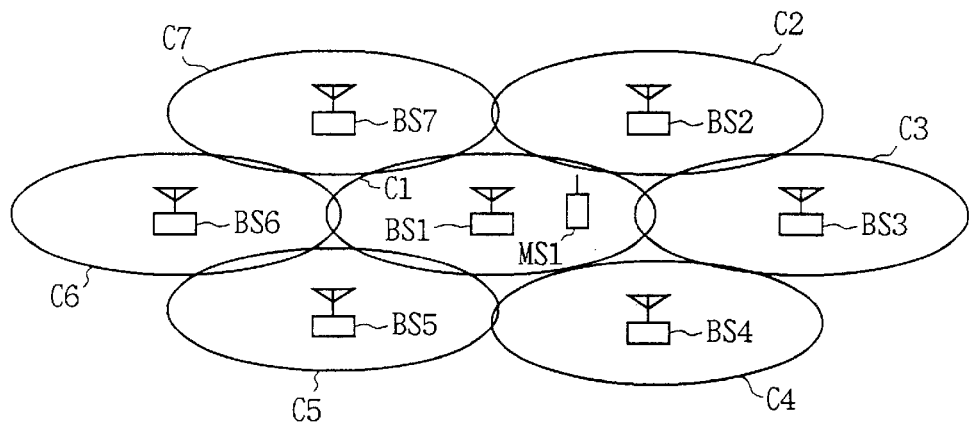
FIG. 1 is a diagram explaining a cellular radio communication system.
Figure 2:
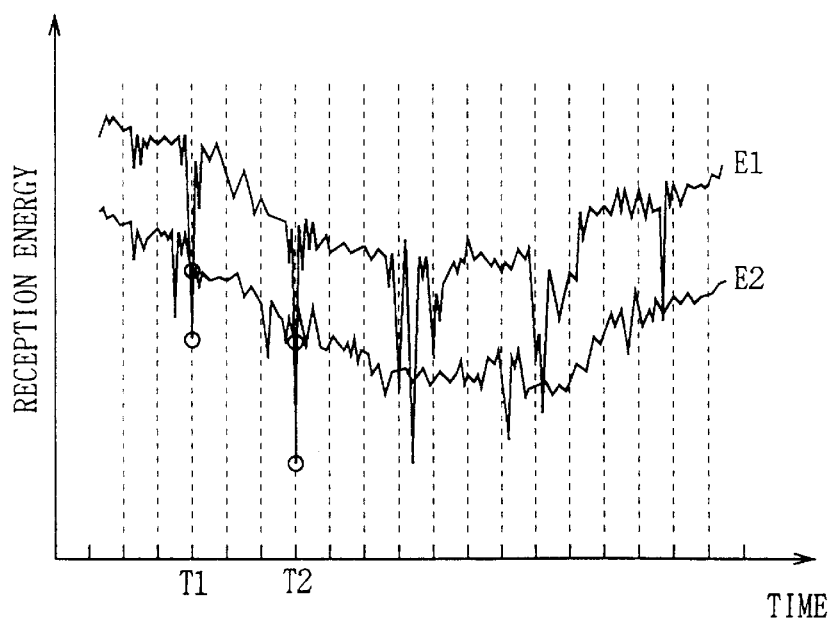
FIG. 2 is a chart showing a change in reception energy.
Figure 3:
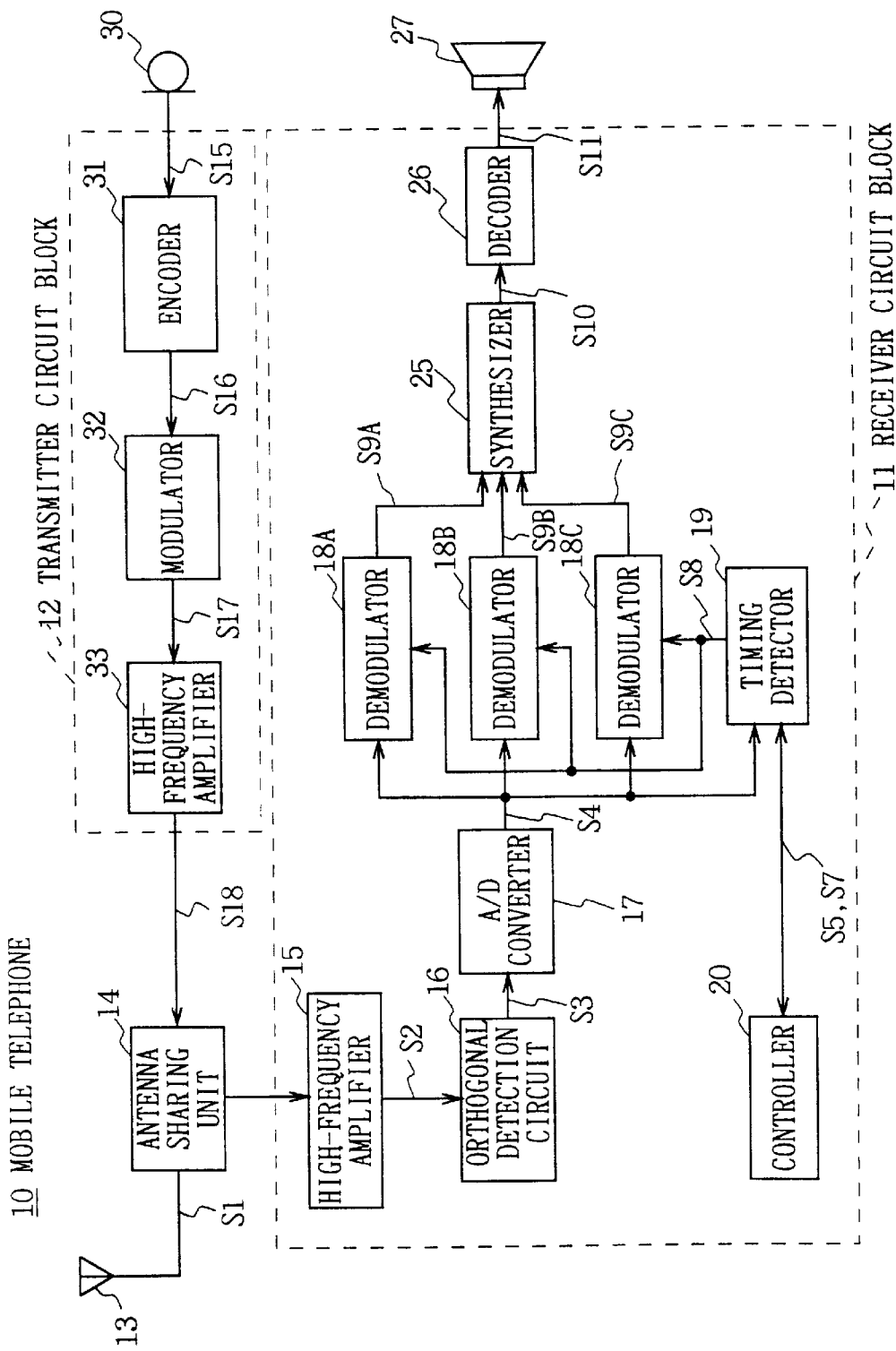
FIG. 3 is a block diagram showing the configuration of a mobile telephone according to one embodiment of the present invention.

In FIG. 3, numeral 10 shows a CDMA-type mobile telephone 10 as a whole. The mobile telephone 10 composed of a receiver circuit block 11 and a transmitter circuit block 12 receives radio waves transmitted from a plurality of base stations. The mobile telephone 10 receives radio waves transmitted from a base station with an antenna 13 at the time of reception and inputs the received signal S1 via an antenna sharing unit 14 to a high-frequency amplifier 15. This antenna sharing unit 14 is composed of a circuit for splitting received signals and transmit signals.

The high-frequency amplifier 15 amplifies the received signal S1 to generate and output a high-frequency signal S2 to an orthogonal detection circuit 16. The orthogonal detection circuit 16 generates a baseband signal S3 via orthogonal detection of the high-frequency signal S2 and outputs the signal to an analog/digital (A/D) converter 17. The A/D converter 17 performs A/D conversion on the baseband signal S3 and outputs the resultant digital data S4 to demodulators 18A to 18C and to a timing detector 19.

Figure 4:
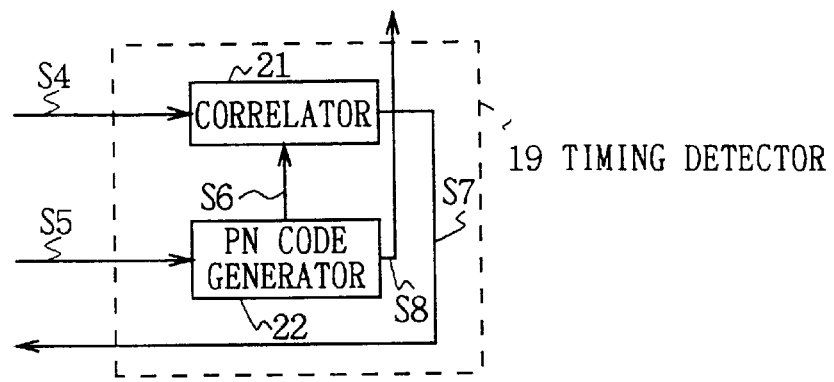
FIG. 4 is block diagram showing the configuration of a timing detector.

The timing detector 19 is connected to a controller 20 to controlled. As shown in FIG. 4, the timing detector 19 is composed of a correlator 21 and a pseudo random noise sequence (PN) code generator 22, and the digital data S4 output from the converter 17 is input to the correlator 21. The PN code generator 22 generates a PN code S6 at the timing based on a control signal S5 supplied from the controller 20, and outputs the PN code S6 to the correlator 21. The correlator 21 relates between the pilot signal included in the digital data and the PN code S6 and outputs the resultant correlative value to the controller 20.

The controller 20 analyzes the correlative value S7 to generate the control signal S5 for controlling the start timing the PN code S6 so that the start timing, that is, the phase, the PN code 56 output from the PN code generator 22 matches start timing of the pilot signal included in the digital data S4.

Under this state, the controller 20 sets the correlative value S7 as the reception energy of the base station which transmits the pilot signal, when the start timing of the PN code S6 output from the PN code generator 22 matches the start timing of the pilot signal included in the digital data S4.

The controller 20 generates the control signal S5 which indicates matching of timing and outputs the control signal S5 to the PN code generator 22 when the start timing of the PN code S6output from the PN code generator 22 matches the start timing of the pilot signal included in the digital data S4. The PN code generator 22 of the timing detector 19 generates a timing detection signal S8 which indicates the start timing of the PN code S6 based on the control signal S5 and outputs the timing detection signal S8 to the demodulators 18A to 18C.

Each of the demodulators 18A to 18C is equipped with a built-in PN code generator to generate a PN code at desired timing based on the timing detection signal S6 supplied from the timing detector 19. The demodulators 18A to 18C multiply the digital data S4 by the PN code for the inverse spread spectrum to generate demodulated data S9A to S9C of the data transmitted through multiple transmission paths (so called, the multipath) and output the data S9A to S9C to a synthesizer 25.

A plurality of base stations transmit pilot signals at different timing. Since the interval of timing for these pilot signals is longer than the transmission delay time of the multipath, the demodulators 18A to 18C demodulate only radio waves transmitted from a single base station out of the plurality of base stations.

The synthesizer 25 generates receive data S10 with a large S/N (signal-to-noise) ratio and a large D/U (desired to undesired signal) ratio by synthesizing the demodulated data S9A to S9C under synchronization of their timing and outputs the data S10 to the decoder 26. The decoder 26 applies a predetermined decoding processing to the receive data S10 and outputs the resultant audio signal S11 via a speaker 27.

At the time of transmission, the audio signal S15 input from a microphone 30 is input to an encoder 31. The encoder 31 applies a predetermined encoding processing to the audio signal S15 and outputs the resultant transmit data S16 to a modulator 32. The modulator 32 applies a predetermined modulation processing (for example, the four Phase modulating processing) to the transmit data S16 and then, applies a spread spectrum modulation to generate and output a modulated signal S17 to the high-frequency amplifier 33. The high-frequency amplifier 33 amplifies the modulated signal S17 and supplies the resultant transmit signal S18 via the antenna sharing unit 14 to the antenna 13. Thus, the transmit signal S18 is transmitted from the antenna 13.

The mobile telephone 10 monitors reception energy not only from a base station being connected by radio but also from the reception energy from base stations adjacent to the base station, because the movement of the mobile telephone 10 may cause the switchover to a base station which has to be connected. However, it is difficult to equip the mobile telephone 10 with the number of timing detectors 19 and controllers 20 corresponding to the number of base stations to be monitored.

Therefore, the mobile telephone 10 comprises only a single timing detector 19 and a single controller 20. The controller 20 supplies the control signals S5, which are based on timing information of the pilot signals transmitted from a base station being currently connected and the plurality of adjacent base stations, to the PN code generator 22 of the timing detector 19 and thereby, sequentially changes the start timing of the PN code S6 and monitors the reception energy of the plurality of base stations in time division. The mobile telephone 10 does not simultaneously receive pilot signals transmitted from base stations and successively monitor their reception energy, but it detects the reception energy of the pilot signals transmitted from a plurality of base stations at predetermined time intervals and monitors the reception energy in time division.

In such a mobile telephone 10, when the timing of detecting reception energy matches the timing when the reception energy temporarily and greatly attenuates due to fading, it is possible to cause the case where the value of reception energy temporarily and greatly attenuates, or the case where the reception energy can not be detected because the timing detector 19 and the controller 20 exceed their measurement limits.

Figure 5:
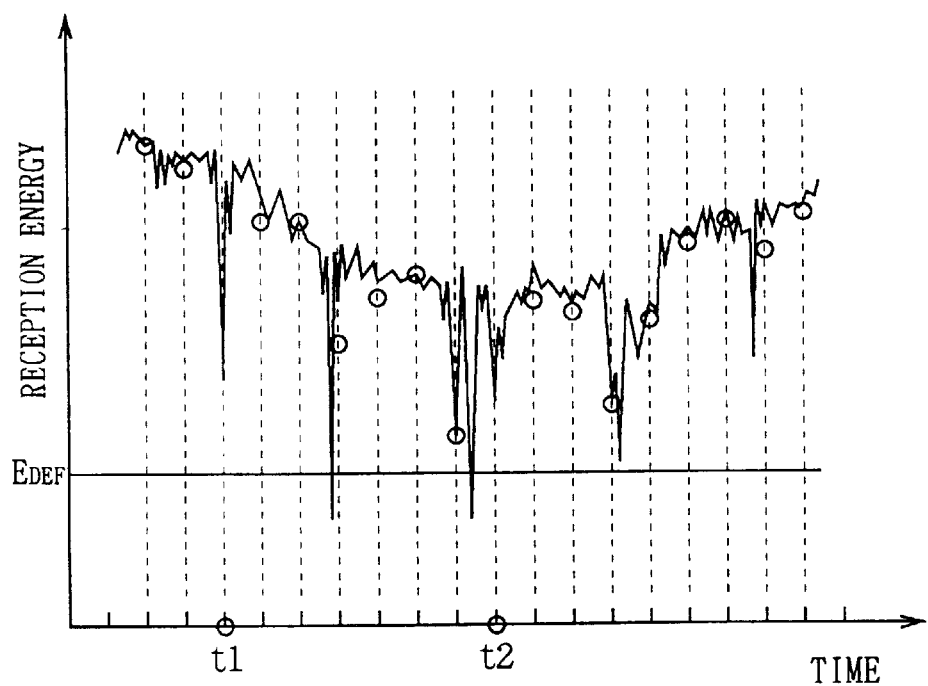
FIG. 5 is a chart showing a change in reception energy.

For example, FIG. 5 shows a change in reception energy from the base station with the passage of time. Encircled locations in the figure represent values of detected reception energy. From the figure it is understood that the reception energy has temporarily and greatly attenuated due to fading or the like at the detection timings at time t1 and time t2, and the reception energy could not be detected. In this case, the controller 20 sets the reception energy to a predetermined default value $E_{DEF}$. The default value $E_{DEF}$ is the minimum measurement value based on attributes of the base stations to be monitored, such as whether a base station is the base station being currently connected.

Figure 6:
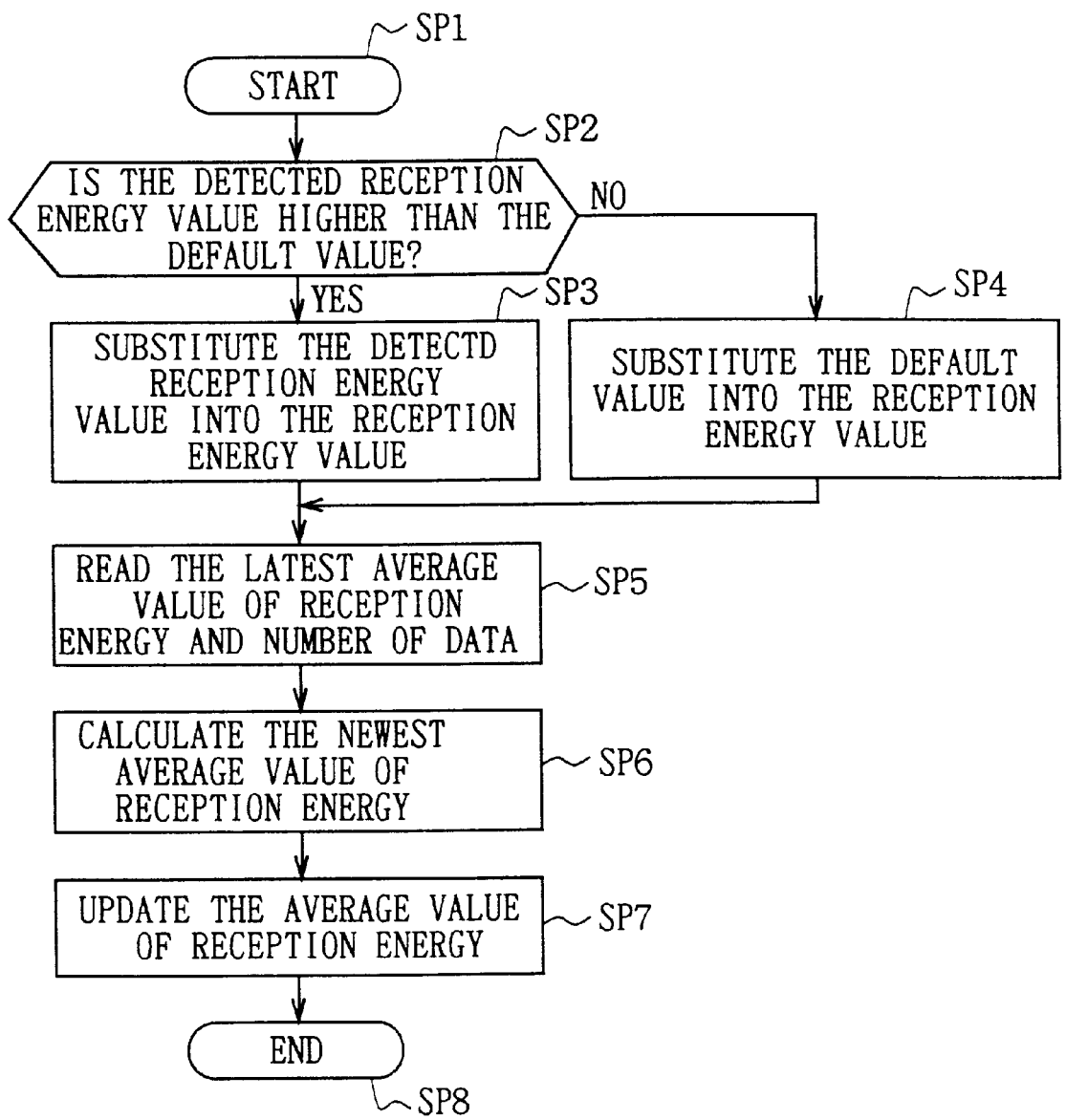
FIG. 6 is a flow chart showing a reception energy management method.

How to manage the reception energy at the controller 20 will be explained using FIG. 6. In step SP2 following the startstep SP1, the controller 20 determines with respect to each of received signals from a plurality of base stations whether the detected reception energy value $E_{DET}$ is higher than the default value $E_{DEF}$. If the controller 20 determines that the detected reception energy value $E_{DET}$ is higher than the default value $E_{DEF}$, the controller 20 moves to step SP3. Otherwise the controller 20 moves to step SP4.

In step SP3, the controller 20 substitutes the detected reception energy value $E_{DET}$ directly into the reception energy value $E_{NEW}$. On the other hand, in step SP4, the controller 20 substitutes the preset default value $E_{DEF}$ into the reception energy value $E_{NEW}$. In step SP5, the controller 20 reads the latest average value $A_{OLD}$ of reception energy and the number N of data used in calculating the average value $A_{OLD}$ from a predetermined storage area such as a memory (not shown) in the controller 20.

In step SP6, the controller 20, with respect to each of reception signals from a plurality of base stations, obtains the newest average value $A_{NEW}$ of reception energy by using the aforementioned reception energy value $E_{NEW}$ and the latest average value $A_{OLD}$ of reception energy and the number of data N with the following equation:

$$A_{NEW} = \frac{A_{OLD} \times (N-1) + E_{NEW}}{N} \tag{1}$$

In step SP7, the controller 20 writes the calculated newest average value $A_{NEW}$ of reception energy to the memory to update the average value of reception energy. The controller 20 then moves to step SP8 to terminate this processing.

In the above configuration, the mobile telephone 10 continuously monitors the reception energy by detecting the reception energy of pilot signals transmitted from the base stations. At this time, the mobile telephone 10 calculates the newest average value by using the detected reception energy and the average value of a plurality of reception energy detected in the past, to set the newest average value as the reception energy.

When the reception energy temporarily and greatly attenuates due to fading or the like, the reception energy from a base station adjacent to the base station communicating may be larger than the reception energy from the base station currently communicating. Thus, the mobile telephone 10 repeatedly performs handoff in a moment in the case where the handoff is executed based on the detected reception energy, and this could cause malfunction of the mobile telephone 10.

However, the mobile telephone 10 calculates the newest average value by using the detected reception energy and the average value of a plurality of reception energy detected in the past, so as to set the newest average value as the reception energy. Thereby, a further accurate reception energy can be obtained in comparison with the case of simply detecting the reception energy, even when the detected reception energy varies temporarily and greatly due to fading or the like. As a result, an unstable operation such as repeated handoffs in a moment can be avoided.

Further, the mobile telephone 10 sets a predetermined default value as the reception energy in the case where it failed to detect the reception energy, so that a further accurate average value can be calculated in comparison with the case where the average of reception energy is calculated by letting the reception energy="0".

Further, the mobile telephone 10 uses the average value of a plurality of reception energy detected in the past and the number of data used in calculating the average value, to calculate the newest average value. Therefore, all values of reception energy in the past do not have to be-stored into the memory thus reducing the memory capacity for a simpler configuration.

According to the above configuration, the newest average value is calculated by using the detected reception energy and the average value of a plurality of reception energy detected in the past while always monitoring reception energy of pilot signals transmitted from base stations. The newest average value is set as the reception energy of received signal transmitted from the base station being currently connected by radio, to be compared with reception energy of received signals from adjacent base stations, so that unnecessary handoff, that is, the mobile telephone performs handoff to an adjacent base station, can be avoided if the detected reception energy temporarily and greatly varies.

Note that, in the above embodiment, the newest average value is calculated by using the detected reception energy and the average value of a plurality of reception energy detected in the past. However, the present invention is not limited thereto and a plurality of reception energy detected in the past can be stored in a memory to calculate the average value by using the plurality of reception energy and the reception energy detected this time.

For example, in case the reception energy $E_N$ is detected, the average value of reception energy A is calculated using the following equation (2) based on the reception energy $E_1$ to $E_N$:

$$A = \frac{E_1 + \ldots + E_N}{N} \quad (2)$$

When the reception energy $E_{N+1}$ is detected next, the average value A of reception energy is calculated using the following equation (3) based on the reception energy $E_2$ to $E_{N+1}$:

$$A = \frac{E_2 + \ldots + E_{N+1}}{N} \quad (3)$$

Further, in the above embodiment, the newest average value is calculated by using the detected reception energy and the average value of a plurality of reception energy detected in the past. However, the present invention is not limited thereto and the similar effect to the above embodiment can be obtained in the case of utilizing a weighted average method of weighting the latest reception energy in terms of time.

Further, in the above embodiment, the timing detector 19 is used to detect the correlative value S7 as the reception energy from the digital data S4. However, the present invention is not limited thereto and can also use a detecting means for detecting reception energy of base stations based on the received signal S1 received with the antenna 13.

Further, in the above embodiment, the controller 20 is used to calculate the newest average value by using the reception energy detected this time and the average value of a plurality of reception energy detected in the past. However, the present invention is not limited thereto and can also use a reception energy management means for calculating the average value by using the detected reception energy and the reception energy detected in the past, setting the average value as reception energy and thereby monitoring the reception energy.

Furthermore, in the above embodiment, the present invention is applied to the CDMA-type mobile telephone 10. However, the present invention is not limited thereto and can be also widely applied to mobile telephones of a variety of other communication systems such as the time division multiple access (TDMA) system, by setting the field strength obtained when radio waves are received from base stations as reception energy.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A mobile communication apparatus, comprising:
    an antenna for receiving signals transmitted from a plurality of base stations;
    demodulating means for demodulating a single received signal of a plurality of received signals received by said antenna;
    detecting means for repeatedly and successively detecting reception energy values of said plurality of received signals; and
    control means for calculating, whenever said detecting means detects each of said reception energy values of said plurality of received signals, an average value of said reception energy values, comparing said average value with the reception energy values, and demodulating a reception signal having a largest reception energy value with said demodulating means,
    wherein said control means uses a number N of reception energy values of said plurality of received signals to calculate said average value, wherein N is at least two,
    wherein said control means stores said number N of reception energy values of said plurality of received signals and reads said number N of reception energy values to calculate said average value, and
    wherein said control means stores the number N and a latest average value $A_{old}$ of reception energy values, and obtains a newest average value $A_{new}$ by using a detected newest reception energy value $E_{new}$, where $A_{new} = \{A_{old} \times (N-1) + E_{new}\}/N$.

2. The mobile communication apparatus according to claim 1, wherein
    said received signal is a spread spectrum signal and a signal generated by applying an inverse spread spectrum to said spread spectrum signal corresponds to said reception energy.

3. A mobile communication apparatus comprising:
    an antenna for receiving signals transmitted from a plurality of base stations;
    demodulating means for demodulating a single received signal of a plurality of received signals received by said antenna;
    detecting means for repeatedly and successively detecting reception energy values of said plurality of received signals; and
    control means for calculating, whenever said detecting means detects each of said reception energy values of said plurality of received signals, an average value of reception energy values, comparing said average value with the reception energy values, and demodulating a reception signal having a largest reception energy value with said demodulating means wherein
    said control means gives a newer reception energy value larger weight when said average value of said reception energy values is calculated.

4. A method of receiving mobile communication signals, comprising the steps of:
    receiving signals transmitted from a plurality of base stations;
    repeatedly and successively detecting reception energy values of said plurality of received signals; and
    whenever each of said reception energy values of said plurality of received signals is detected, calculating an average value of said reception energy values, comparing said average value of reception energy with said reception energy values, and demodulating a received signal having a largest reception energy value,
    wherein said average value is calculated by using a number N of reception energy values of said plurality of received signals, where N is at least two, wherein said average value is calculated by storing said number N of reception energy values of said plurality of received signals and reading said number N of reception energy values, and wherein the number N and a latest average value $A_{old}$ of said reception energy values are stored, and a newest average value $A_{new}$ is obtained by using a detected newest reception energy value $E_{new}$, where $$A_{new} = \{A_{old} \times (N-1) + E_{new}\}/N.$$

5. The method of receiving mobile communication signal according to claim 4, wherein said received signal is a spread spectrum signal and a signal generated by applying an inverse spread spectrum to said spread spectrum signal corresponds to said reception energy.

6. A method of receiving mobile communication signals comprising the steps of:

receiving signals transmitted from a plurality of base stations;

repeatedly and successively detecting reception energy values of said plurality of received signals; and whenever each of said reception energy values of said plurality of received signals is detected, calculating an average value of said reception energy values, comparing said average value of reception energy with said reception energy values, and demodulating a received signal having a largest reception energy value, wherein said average value is calculated by using a number N of reception energy values of said plurality of received signals, wherein N is at least two, and wherein a newer reception energy value is given larger weight when said average value of said reception energy values is calculated.

* * * * *